United States Patent
Mie et al.

(10) Patent No.: US 7,796,609 B2
(45) Date of Patent: Sep. 14, 2010

(54) PACKET PROCESSING DEVICE WITH LOAD CONTROL MECHANISM BASED ON PACKET LENGTH AND CPU TIME CONSUMPTION

(75) Inventors: Kouki Mie, Fukuoka (JP); Nobuyuki Shima, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 748 days.

(21) Appl. No.: 11/769,445

(22) Filed: Jun. 27, 2007

(65) Prior Publication Data
US 2008/0019372 A1 Jan. 24, 2008

(30) Foreign Application Priority Data
Jul. 24, 2006 (JP) .............................. 2006-200358

(51) Int. Cl.
H04L 12/56 (2006.01)
(52) U.S. Cl. .................................... 370/395.4; 370/428
(58) Field of Classification Search ................. 370/412, 370/220, 474, 394, 395.32, 352, 468, 235, 370/252, 230, 389, 230.1; 708/650; 712/36; 709/237, 249; 710/45
See application file for complete search history.

(56) References Cited

U.S. PATENT DOCUMENTS

| | | | | |
|---|---|---|---|---|
| 5,528,587 | A * | 6/1996 | Galand et al. ................ | 370/412 |
| 5,663,949 | A * | 9/1997 | Ishibashi et al. ............. | 370/220 |
| 6,816,928 | B1 * | 11/2004 | Yoshii ......................... | 710/45 |
| 6,967,928 | B1 * | 11/2005 | Kikuta ........................ | 370/252 |
| 7,133,363 | B2 * | 11/2006 | Takase et al. ................ | 370/230 |
| 7,149,184 | B2 * | 12/2006 | Takada et al. ............... | 370/230 |
| 7,395,301 | B2 * | 7/2008 | Georgescu et al. .......... | 708/650 |
| 7,397,765 | B2 * | 7/2008 | Aimoto et al. .............. | 370/252 |
| 7,403,518 | B2 * | 7/2008 | Tsuchida et al. ............ | 370/389 |
| 7,660,249 | B2 * | 2/2010 | Toda et al. ................. | 370/230.1 |
| 2001/0014105 | A1 * | 8/2001 | Tezuka et al. ............... | 370/474 |
| 2002/0016905 | A1 * | 2/2002 | Kojima et al. .................. | 712/36 |

(Continued)

FOREIGN PATENT DOCUMENTS

EP 1401157 A1 * 3/2004

(Continued)

OTHER PUBLICATIONS

Traffic Engineering Methods for a Network Processor based Multimedia Router; Amr Elramly; Ein Shams University, 1982.*

(Continued)

*Primary Examiner*—Salman Ahmed
(74) *Attorney, Agent, or Firm*—Katten Muchin Roseman LLP

(57) ABSTRACT

A packet processing device that achieves stable operation by alleviating the workload of packet processing. A packet buffer checks a packet length flag and a processing time flag to observe the device's operating condition for a first connection. When neither of the two flags are on, the packet buffer keeps buffering first packets on the first connection. When either or both flags are on, the packet buffer changes focus to a second connection and begins buffering second packets on the second connection. A packet length monitor turns on the packet length flag if a new cumulative packet length is greater than a packet length threshold. A processing time monitor turns on the processing time flag if a new cumulative processing time estimate is greater than a predetermined processing time threshold.

4 Claims, 6 Drawing Sheets

U.S. PATENT DOCUMENTS

| | | | |
|---|---|---|---|
| 2002/0019882 A1* | 2/2002 | Soejima et al. | 709/249 |
| 2002/0122424 A1* | 9/2002 | Kawarai et al. | 370/394 |
| 2003/0120802 A1* | 6/2003 | Kohno | 709/237 |
| 2003/0227925 A1* | 12/2003 | Matsuo et al. | 370/395.32 |
| 2004/0184444 A1* | 9/2004 | Aimoto et al. | 370/352 |
| 2005/0157752 A1* | 7/2005 | Takase et al. | 370/468 |
| 2005/0213504 A1* | 9/2005 | Enomoto et al. | 370/235 |
| 2010/0080126 A1* | 4/2010 | Higashida | 370/235 |

FOREIGN PATENT DOCUMENTS

| | | |
|---|---|---|
| GB | 2 304 211 | 3/1997 |
| JP | 06-350603 A | 12/1994 |
| JP | 2004-007256 A | 8/2004 |

OTHER PUBLICATIONS

European Search Report dated Mar. 10, 2008, from the corresponding European Application.

Yoshinori Aoki, et al. "A Load Distribution Scheme for a New Transaction Service Considering the Pre-Loaded Services" IEICE Transactions on Information and Systems, Information & Systems Society, Tokyo, Japan, vol. E82-D, No. 11, Nov. 1999, pp. 1447-1456.

* cited by examiner

PACKET PROCESSING DEVICE WITH LOAD CONTROL MECHANISM BASED ON PACKET LENGTH AND CPU TIME CONSUMPTION

CROSS-REFERENCE TO RELATED APPLICATIONS

This application is based upon and claims the benefits of priority from the prior Japanese Patent Application No. 2006-200358, filed on Jul. 24, 2006, the entire contents of which are incorporated herein by reference.

BACKGROUND OF THE INVENTION

1. Field of the Invention

The present invention relates to packet processing devices and more particularly to a packet processing device that processes packets with firmware of a central processing unit (CPU).

2. Description of the Related Art

Mobile communication devices such as cellular phones are increasingly used in recent years, which leads to an explosive growth of packet traffic flowing over wireless networks. In such circumstances, CPUs employed for packet processing are under a heavy load and thus experience firmware hang-up (freezing) problems more and more often, resulting in degraded quality of communication service. For this reason, the packet processor in a radio network controller (RNC, an upper-level station that manages base stations) is designed to alleviate the CPU workload by limiting the number of packets to be processed in each unit time, depending on the length of received packets.

For example, the Japanese Patent Application Publication No. 2004-007256, paragraphs Nos. 0020 to 0035 and FIG. 1 proposes a technique of controlling packet transmission based on packet lengths. According to this technique, a packet routing device calculates a suspend time from the lengths of received packets and sends back a suspend packet containing the calculated suspend time, so that the sender will suspend transmission of next packets for the specified suspend time.

Such packet processing devices process packets whose length varies from packet to packet. Think of an incoming packet flow with a specific traffic bandwidth. The number of packets depends, in general, on the packet length. To be more specific, the traffic may actually be a small number of long packets. Or it many be a large number of short packets. In the latter case, the packet processing device has to process packet headers more often than in the former case. This results in an excessive overhead of packet processing, which consumes more CPU-time resources than in the case of long packets, consequently affecting control tasks for other subsystems in the device.

As can be seen from the above discussion, an increase in the number of incoming short packets, or in the number of connection paths established at the packet processing device, will raise the CPU-time consumption. This brings more chances for hang-up of packet processing, as well as causing adverse effect on other control tasks. The conventional technique of reducing CPU load based only on the packet length is not effective enough to solve, or even alleviate, the problem.

SUMMARY OF THE INVENTION

In view of the foregoing, it is an object of the present invention to provide a packet processing device that achieves stable operation by alleviating the workload of packet processing and thus improves the quality of communication service.

To accomplish the above object, the present invention provides an apparatus for processing packets which is formed from the following elements: a packet buffer, a packet processor, a packet length monitor, a management table, a processing time monitor, and a processed packet sender. The packet buffer buffers either first packets on a first connection or second packets on a second connection that is different from the first connection. The packet buffer initially focuses on the first connection and checks a packet length flag and a processing time flag to observe the condition of packet processing for the first connection. When neither of the two flags are on, the packet buffer keeps buffering the first packets on the first connection. When either the packet length flag or the processing time flag or both are on, the packet buffer changes focus from the first connection to the second connection and begins buffering the second packets on the second connection. The packet processor processes a packet read out of the packet buffer, thus outputting a processed packet. The processed packet sender outputs this processed packet to an external link. The packet length monitor calculates a new cumulative packet length by adding a length of the processed packet to a cumulative sum of lengths of past processed packets. The packet length monitor turns on the packet length flag if the new cumulative packet length is greater than a predetermined packet length threshold. The management table stores values of packet length ranges and processing time estimates in an associated manner. Here, the packet length ranges are ranges of packet lengths, and the processing time estimate corresponding to a particular packet length range refers to an estimated time for processing a packet with a length falling within that packet length range. The processing time monitor searches the management table to find a processing time estimate corresponding to the packet length of the processed packet, calculates a new cumulative processing time estimate by adding the found processing time estimate to a cumulative sum of processing time estimates of past packets. If the new cumulative processing time estimate is greater than a predetermined processing time threshold, the processing time monitor turns on the processing time flag.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
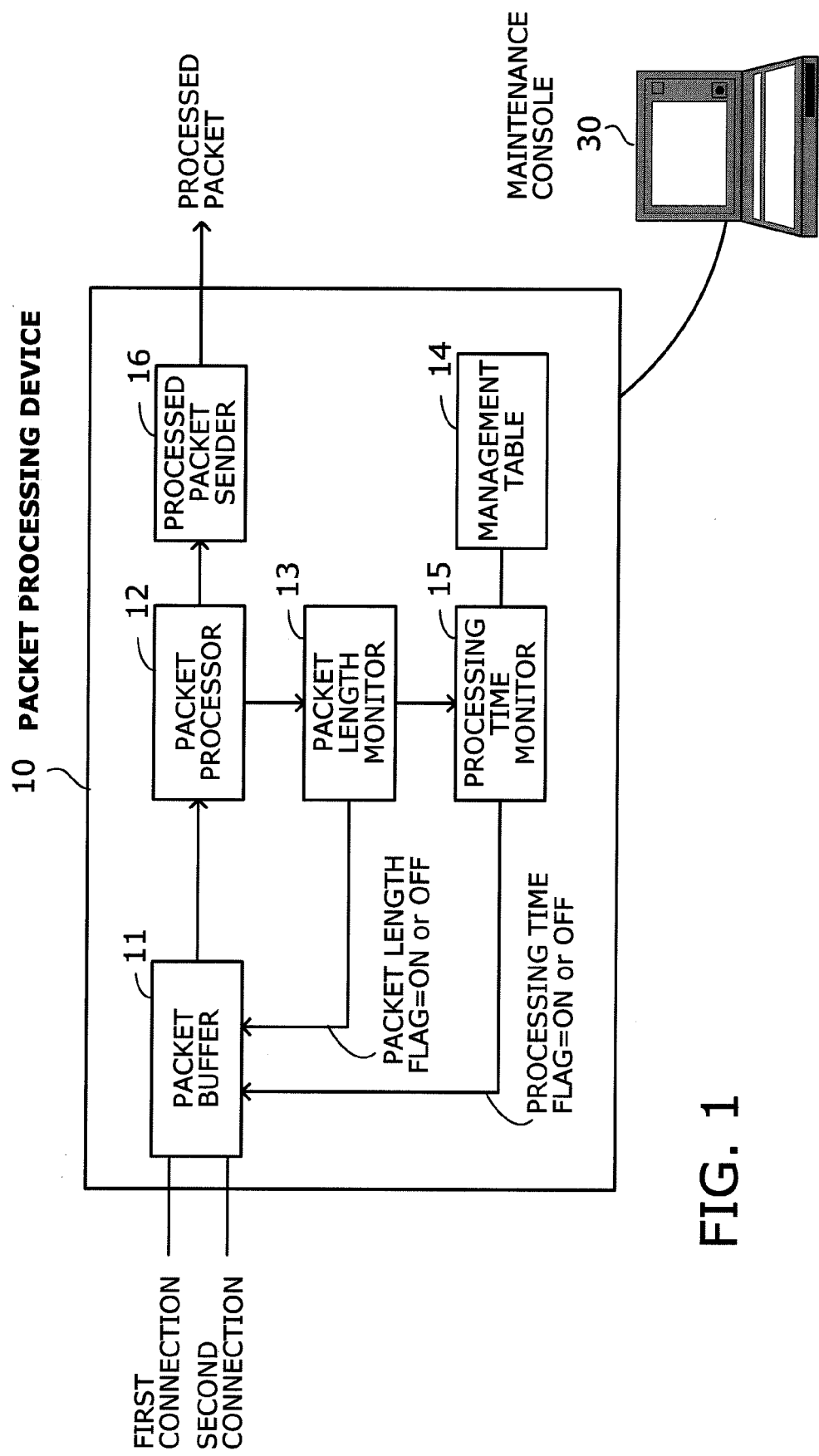
FIG. 1 is a conceptual view of a packet processing device according to the present invention.

Preferred embodiments of the present invention will be described below with reference to the accompanying drawings, wherein like reference numerals refer to like elements throughout.

FIG. 1 is a conceptual view of a packet processing device according to the present invention. This packet processing device 10 is formed from a packet buffer 11, a packet processor 12, a packet length monitor 13, a management table 14, a processing time monitor 15, and a processed packet sender 16. For operations and maintenance purposes, a maintenance console 30 can be attached to the packet processing device 10.

The packet buffer 11 buffers either first packets on a first connection or second packets on a second connection that is different from the first connection. The packet buffer 11 initially focuses on the first connection and checks a packet length flag and a processing time flag to observe the condition of packet processing for the first connection. When neither of the two flags are on (in other words, if both flags are off), the packet buffer keeps buffering the first packets on the first connection. When either the packet length flag or the processing time flag or both are on, the packet buffer 11 changes focus from the first connection to the second connection and begins buffering second packets on the second connection.

The packet processor 12 processes a packet read out of the packet buffer 11, thus outputting a processed packet. The packet length monitor 13 adds the length of this processed packet to a cumulative sum of the lengths of past packets, thus outputting a new cumulative packet length. The packet length monitor 13 turns on a packet length flag if the new cumulative packet length is greater than a packet length threshold that is defined previously. The packet length threshold is given from an external source (e.g., maintenance console 30) through an external command interface (not shown).

The management table 14 manages information called "packet length ranges" and "processing time estimates" in an associated manner. Packet length ranges are ranges of packet lengths. The processing time estimate corresponding to a particular packet length range is an estimated time for processing a packet with a length falling within that packet length range.

The processing time monitor 15 searches the management table 14 to find a processing time estimate corresponding to the packet length of the processed packet and calculates a new cumulative processing time estimate by adding the found processing time estimate to a cumulative sum of processing time estimates of the past packets. If the new cumulative processing time estimate is greater than a predetermined processing time threshold, then the processing time monitor 15 turns on a processing time flag. The processed packet sender 16 receives the processed packet from the packet processor 12 and outputs it to an external link. The processing time threshold is given from an external source (e.g., maintenance console 30) through an external command interface (not shown).

User Plane Protocol Converter

The packet processing device 10 described above can be applied to a user plane protocol converter that controls traffic of user plane. The user plane carries voice, images, and other data, as opposed to the control plane carrying control information.

Figure 2:
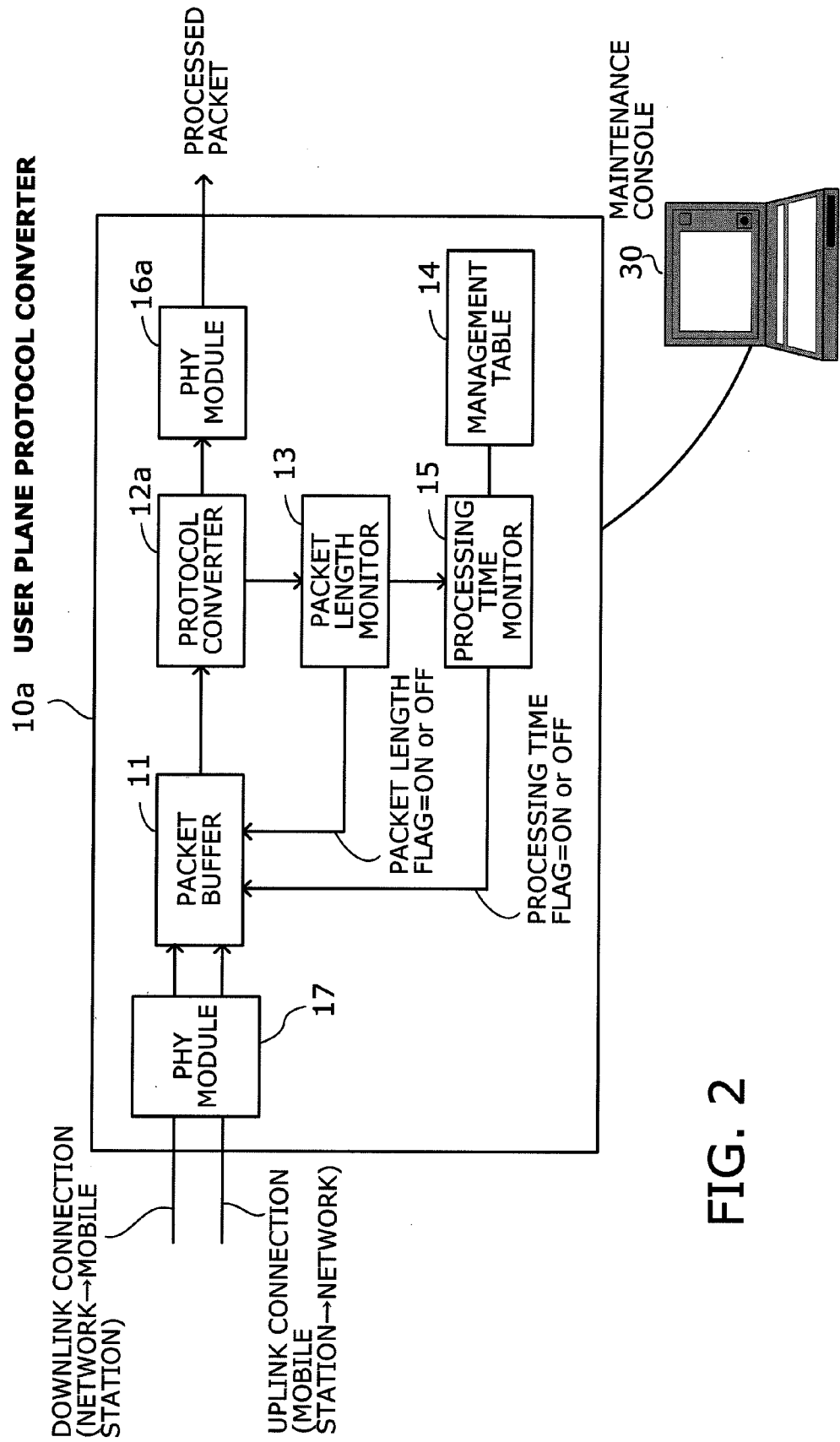
FIG. 2 shows a configuration of a user plane protocol converter.

FIG. 2 shows a configuration of a user plane protocol converter 10a. Some elements of this user plane protocol converter 10a are common to those of the packet processing device 10 shown in FIG. 1, the explanation for which will not be repeated here. The user plane protocol converter 10a is part of a radio network controller (RNC) on a mobile communications network, responsible for processing packet traffic between the network and mobile stations.

According to the present embodiment, the user plane protocol converter 10a is formed from the following elements: PHY (physical layer) modules 16a and 17, a packet buffer 11, a protocol converter 12a, a packet length monitor 13, a management table 14, and a processing time monitor 15.

The PHY module 17 receives packets arriving through downlink connections (network to mobile stations) and uplink connections (mobile stations to network), thus terminating the physical layer and asynchronous transfer mode (ATM) layer.

The PHY module 16a is equivalent to what is shown in FIG. 1 as the processed packet sender 16. The PHY module 16a converts the signal format of outgoing packets so that they will comply with the physical layer and ATM layer specifications.

The protocol converter 12a is equivalent to what is shown in FIG. 1 as the packet processor 12. The protocol converter 12a contains a CPU to convert the protocol of packets flowing in the downlink direction (network to mobile stations) as well as those in the uplink direction (mobile stations to network).

The downlink protocol conversion is a packet processing task that converts an upper-layer packet format to a lower-layer packet format. The uplink protocol conversion is another packet processing task, which converts a lower-layer packet format to an upper-layer packet format.

Figure 3:
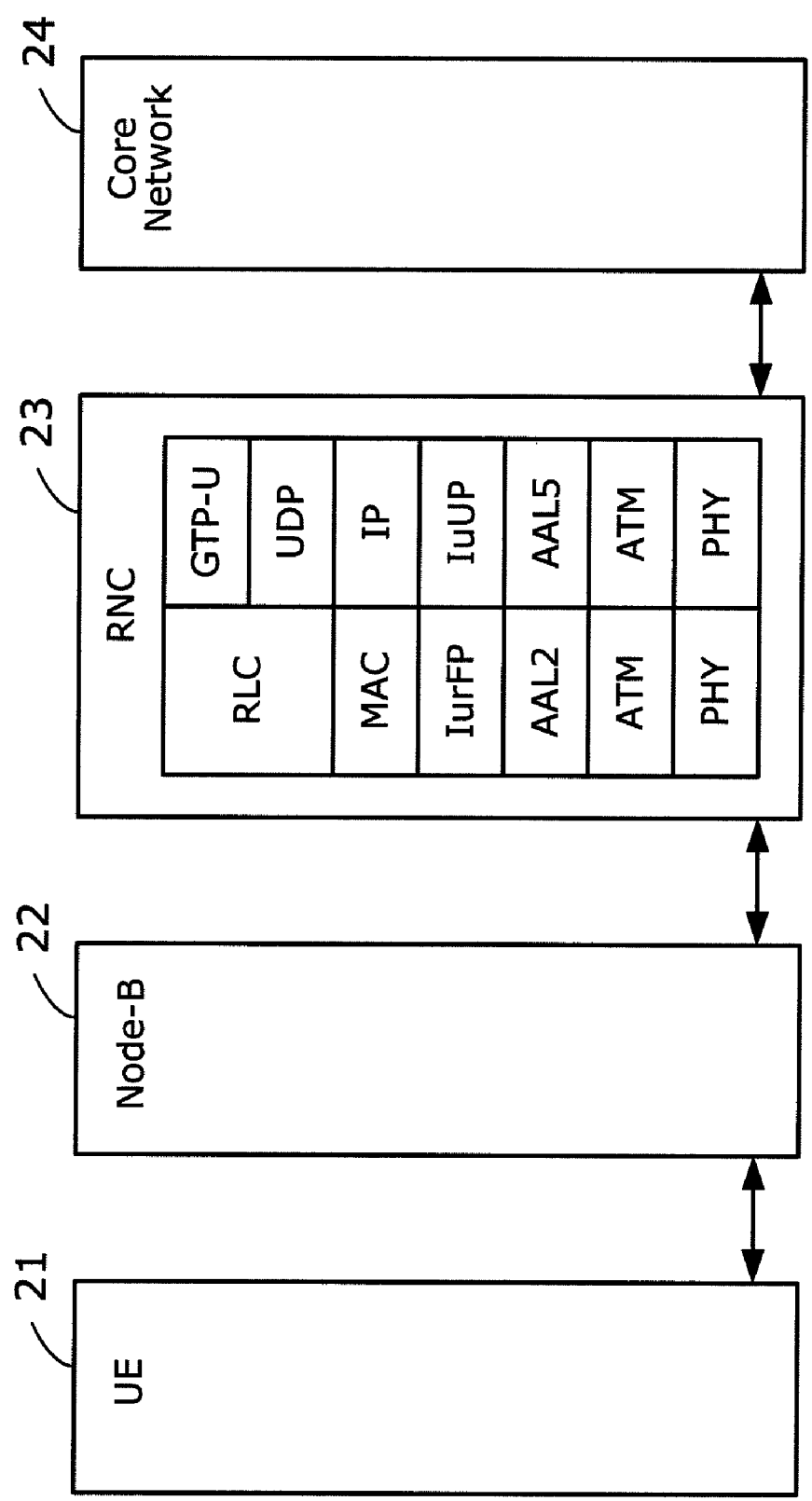
FIG. 3 shows a protocol stack.

FIG. 3 shows a protocol stack. This model involves a UE (user equipment, or mobile station) 21, a node-B (or base station) 22, an RNC 23, and a core network 24 linked in that order. The above-described user plane protocol converter 10a is implemented as part of the RNC 23.

The user plane protocol converter 10a contains two protocol stacks; one is coupled to the node-B 22 and the other is coupled to the core network 24. The former protocol stack begins with PHY at the bottommost layer, on top of which are ATM, AAL2 IurFP, MAC, and RLC in that order. AAL2 is the acronym for "ATM adaptation layer 2." IurFP refers to "Iur Frame Protocol," which provides a logical interface between RNCs. MAC is the acronym of "Media Access Control" and RLC "Radio Link Control." The latter protocol stack, on the other hand, begins with PHY at the bottommost layer, on top of which are ATM, AAL5, IuUP, IP, UDP, and GTP-U in that order. IUUP means "Iu User Plane Protocol." IP is the acronym of "Internet Protocol," UDP "User Datagram Protocol," and GTP-U "GPRS Tunneling Protocol-User" where GPRS means "General Packet Radio Service." Note that the bottommost two layers, PHY and ATM, are implemented as hardware layers of the RNC 23 while the other layers are provided by CPU firmware.

Figure 4:
FIG. 4 shows an example of a management table.

FIG. 4 shows an example of the management table 14. The illustrated management table 14 has two data fields titled "Packet Length Range" and "CPU Time Estimate," the latter field corresponding to the processing time estimates discussed in an earlier section. Suppose, for example, that the protocol converter 12a has processed a packet and that the resulting processed packet has a length that falls within the range of 101 bytes to 500 bytes. In this case, the management table 14 permits the protocol converter 12a to consider that the CPU has consumed about 60 µs to convert the protocol of that particular packet.

The management table 14 may be compiled from packet length range and CPU time estimate field values given from an external source (e.g., maintenance console 30) through an external device interface (not shown).

Operation of User Plane Protocol Converter

Figure 5:
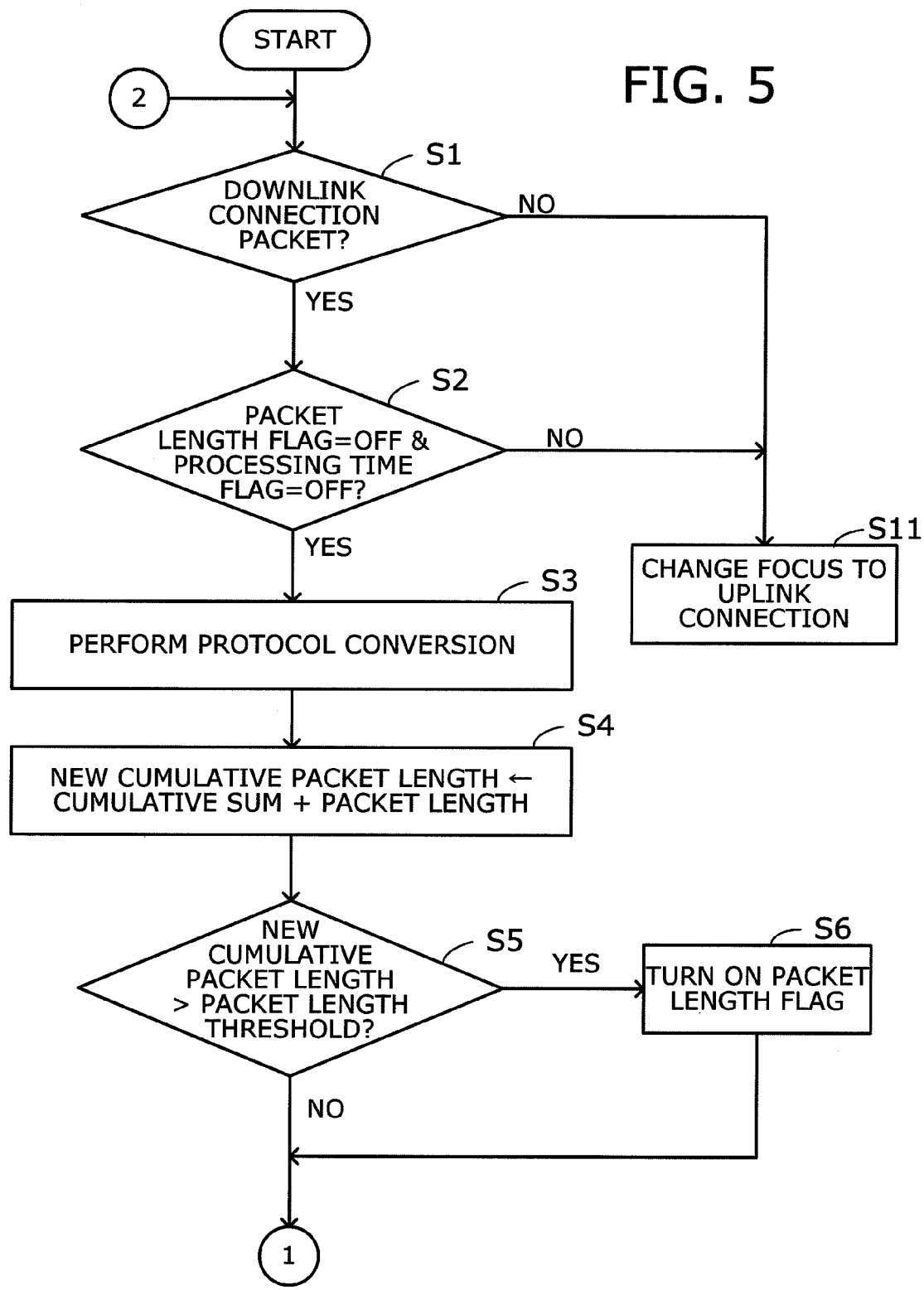
FIGS. 5 and 6 give a flowchart showing how the user plane protocol converter operates.
Figure 6:
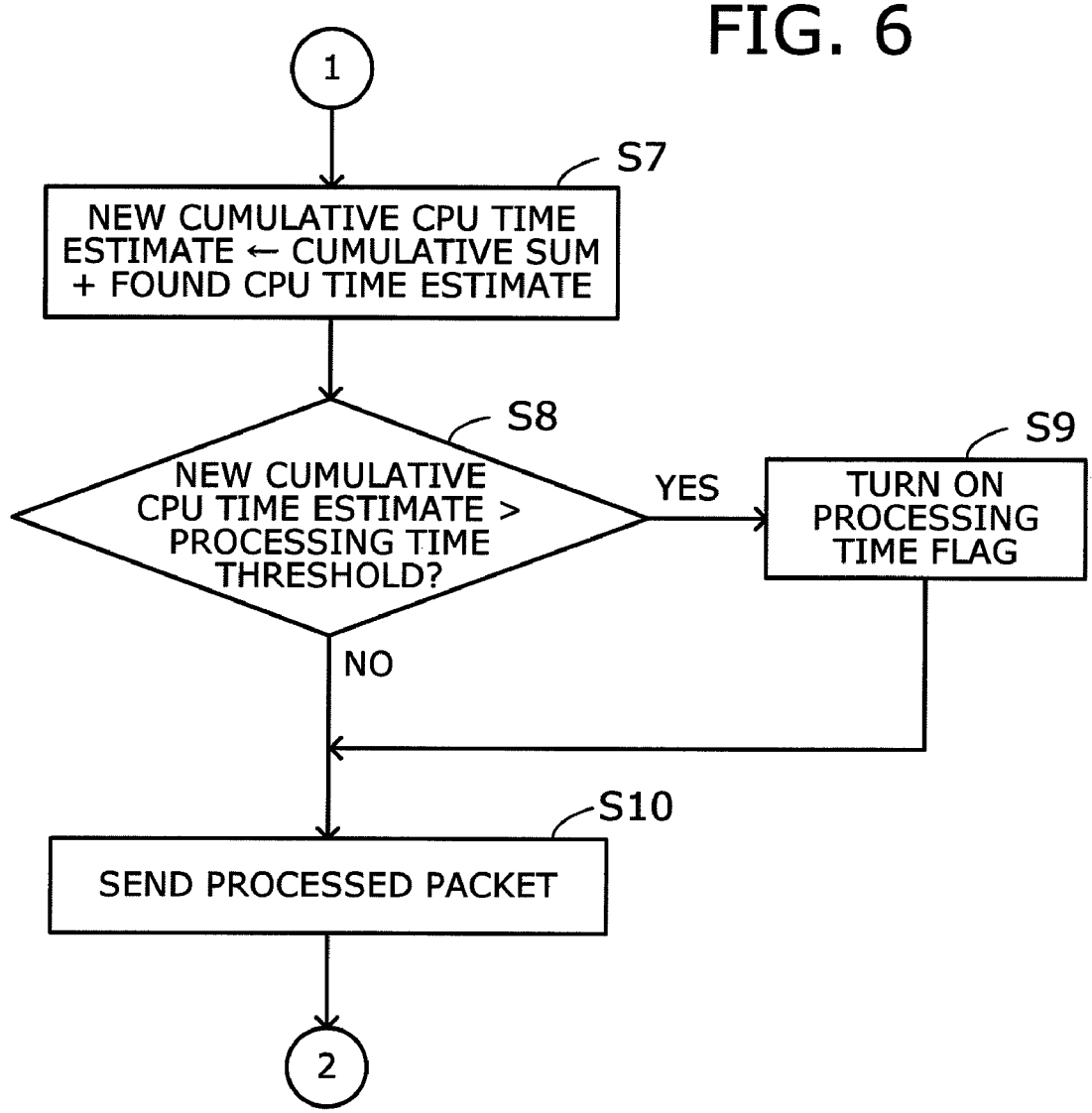

Referring now to the flowchart of FIGS. 5 and 6, this section will show how the user plane protocol converter 10a operates.

(S1) The PHY module 17 receives a packet. If this packet is a first packet (i.e., if it comes from a downlink connection, or first connection, and is directed to the packet buffer 11, the process advances to step S2. If there is no downlink packet for storage, the process proceeds to step S11.

(S2) The packet buffer 11 tests the state of packet length and processing time flags. If both flags are off, the packet buffer 11 saves the received downlink packet, and the process proceeds to step S3. If either or both of those flags are on, then the process goes to step S11.

(S3) The protocol converter 12a performs protocol conversion on the packet read out of the packet buffer 11, thus outputting a processed packet.

(S4) The packet length monitor 13 finds the length of the processed packet and adds that packet length to the cumulative sum of the lengths of packets processed in the past.

(S5) The packet length monitor 13 compares the resulting new cumulative packet length with a predetermined packet length threshold. If the new cumulative packet length exceeds the packet length threshold, then the process advances to step S6. If not, the process proceeds to step S7.

(S6) The packet length monitor 13 turns on the packet length flag.

(S7) The processing time monitor 15 searches the management table 14 to find a CPU time estimate corresponding to the length of the processed packet. Then the processing time monitor 15 adds the found CPU time estimate to the cumulative sum of past CPU time estimates, thus outputting a new cumulative CPU time estimate. This new cumulative CPU time estimate is equivalent to what has been described as "cumulative processing time estimate" in an earlier section, with reference to FIG. 1.

(S8) The processing time monitor 15 compares the resulting new cumulative CPU time estimate with a predetermined processing time threshold. If the new cumulative CPU time estimate exceeds the processing time threshold, then the process advances to step S9. If not, the process proceeds to step S10.

(S9) The processing time monitor 15 turns on the processing time flag.

To give a more specific example of the above steps S7 to S9, suppose that the processed packet is 300 bytes in length, and that the processing time threshold is previously set to 500 μs. The management table 14 then gives a CPU time estimate of 60 μs for that length. Assuming that the current cumulative sum of CPU time estimates for the past protocol-converted packets is 500 μs, the new cumulative CPU time estimate will be 560 μs (=500 μs+60 μs). Since this new cumulative CPU time estimate (560 μs) is greater than the threshold (500 μs), the processing time monitor 15 turns on the processing time flag.

(S10) The PHY module 16a sends out the packet processed by the protocol converter 12a. The process returns to step S1.

(S11) The packet buffer 11 changes focus from the downlink connection to the uplink connection (second connection) and thus begins buffering of uplink packets (or second packets). The above steps S3 to S10 will now be applied to packets on the uplink connections.

As described above, the processing time monitor 15 consults the management table 14 to seek a packet length range that a given packet length falls in. Each time this happens, the processing time monitor 15 increments a counter corresponding to the found packet length range. The processing time monitor 15 have the function of automatically updating the packet length ranges and corresponding processing time estimates, according to the current traffic condition indicated by current values of the counters.

As can be seen from the above explanation, the present embodiment monitors the length and CPU time of each processed packet when a particular connection (downlink connection in the above example) is selected for protocol conversion. If either of those parameters exceeds a given threshold, the corresponding flag (packet length flag, processing time flag) is turned on. The "on" state of those flags means that the currently selected connection (e.g., downlink connection) is imposing a heavy packet processing load on the CPU. The focus of packet processing is thus moved to another connection (e.g., uplink connection). Before moving the focus from one connection C1 to another connection C2, the packet processing device saves the context of packet processing for the connection C1. When the focus returns to the original connection C1, the packet processing device uses the saved packet processing context to resume the interrupted processing.

While the example flowchart of FIGS. 5 and 6 switches between a downlink connection and an uplink connection when either flag is on, the present invention is not limited to that type of switching. As an alternative, the switching of connections may take place from one downlink connection D1 to another downlink connection D2. Or, as another alternative, the switching may take place from one uplink connection U1 to another uplink connection U2.

As another variation of the above-described control, the process of steps S1 to S10 may be applied to a plurality of downlink connections D1 to Dn, one round for each connection, until either or both flags are turned on. When either flag is set to on, the focus moves to a plurality of uplink connections U1 to Un. The process of steps S1 to S10 is now applied to those uplink connections U1 to Un, one round for each connection.

The packet processing device 10 regulates the CPU time consumption for protocol conversion of received packets, no matter how the packet length or the number of established connections may vary, thus avoiding the problem of CPU hang-up. The present invention prevents CPU time resources from being occupied by packet processing, so that other control tasks can keep running. In other words, the present invention helps to maintain the load balance between the components of the device.

Also, the proposed packet processing device allows its packet length threshold and processing time threshold, as well as packet length ranges and CPU time estimates in the management table 14, to be defined through an external control command interface. This feature gives flexibility to operations and maintenance of the system.

Further, the processing time monitor 15 checks the number of processed packets at certain intervals, for each packet length range. Depending on the current traffic condition observed in this way, the processing time monitor 15 automatically updates the packet length ranges and their corresponding processing time estimates. With this feature of the processing time monitor 15, the packet processing device 10 can modifies its operating parameters in a realtime fashion.

CONCLUSION

To summarize the preceding discussion, the present invention provides a packet processing device designed to recognize the current CPU load not only from packet lengths, but also from estimated packet processing times. To achieve this, the packet processing device accumulates the length of packets that it has processed and turns on a packet length flag if that cumulative packet length exceeds a threshold. It also consults a management table to find a processing time estimate corresponding to the length of a processed packet, and if the cumulative sum of such processing time estimates is greater than a threshold, then it turns on a processing time flag. The packet processing device leaves the current connection and turns to another connection when either the packet length flag or the processing time flag or both are set to on. This feature enables the packet processing device to control its own processing workload more adequately and thus achieves stable operation and improved quality of communication service.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An apparatus for processing packets, comprising:

a packet buffer that buffers either first packets on a first connection or second packets on a second connection that is different from the first connection, wherein the packet buffer initially focuses on the first connection and checks a packet length flag and a processing time flag to observe condition of packet processing for the first connection, and wherein the packet buffer keeps buffering the first packets on the first connection when neither of the packet length flag and processing time flag are on, and wherein the packet buffer changes focus from the first connection to the second connection and begins buffering the second packets on the second connection when either the packet length flag or the processing time flag or both are on;

a packet processor that processes a packet read out of the packet buffer, thus outputting the processed packet;

a packet length monitor that calculates a new cumulative packet length by adding a length of the processed packet to a cumulative sum of lengths of past processed packets and turns on the packet length flag if the new cumulative packet length is greater than a predetermined packet length threshold;

a management table storing values of packet length ranges and processing time estimates in an associated manner, wherein the packet length ranges are ranges of packet lengths, and the processing time estimate corresponding to a particular packet length range is an estimated time for processing a packet with a length falling within that packet length range;

a processing time monitor that searches the management table to find a processing time estimate corresponding to the packet length of the processed packet, calculates a new cumulative processing time estimate by adding the found processing time estimate to a cumulative sum of processing time estimates of past packets, and turns on the processing time flag if the new cumulative processing time estimate is greater than a predetermined processing time threshold; and a processed packet sender that outputs the processed packet to an external link.

2. The apparatus according to claim 1, further comprising an external command interface for receiving values of the packet length threshold and the processing time threshold from an external source.

3. The apparatus according to claim 1, further comprising an external command interface for receiving values of the packet length ranges and processing time estimates for the management table from an external source.

4. The apparatus according to claim 1, wherein:

the processing time monitor comprises counters corresponding to the packet length ranges;

each time the processing time monitor searches the management table to seek a packet length range that a given packet length falls in, the processing time monitor increments the counter corresponding to the found packet length range; and the processing time monitor automatically updates the packet length ranges and corresponding processing time estimates, according to current traffic condition indicated by current values of the counters.

* * * * *